United States Patent [19]
Hoff

[11] Patent Number: 4,749,159
[45] Date of Patent: Jun. 7, 1988

[54] WHEEL SUPPORT FOR MOUNTABLE FURNITURE PARTS

[75] Inventor: Bjorn Hoff, Jarfalla, Sweden

[73] Assignee: Sparring Elfa Aktiebolag, Vallingby, Sweden

[21] Appl. No.: 7,124

[22] Filed: Jan. 27, 1987

[30] Foreign Application Priority Data

Feb. 13, 1986 [SE] Sweden ............................. 8600643

[51] Int. Cl.⁴ .............................................. B60B 33/00
[52] U.S. Cl. .................................. 248/214; 248/231.8; 16/29
[58] Field of Search ............ 248/677, 151, 188, 188.8, 248/188.9, 200, 205.1, 214, 220.2, 221.3, 228, 231.8, 309.2, 314, 316.7, 359 F; 16/29, 31 R, 31 A, 39, 43

[56] References Cited

U.S. PATENT DOCUMENTS

| | | | |
|---|---|---|---|
| 1,635,389 | 7/1927 | Shuffleton | 16/29 |
| 2,609,418 | 9/1952 | Binns | 248/300 |
| 2,738,539 | 3/1956 | Schultz | 16/29 |
| 2,972,201 | 2/1961 | Niedermayer | 248/316.7 |
| 2,990,458 | 6/1961 | Mageoch | 248/228 |
| 3,809,799 | 5/1974 | Taylor | 248/316.7 |
| 4,193,572 | 3/1980 | Horiuchi | 248/231.8 |

FOREIGN PATENT DOCUMENTS

| | | | |
|---|---|---|---|
| 858502 | 9/1959 | Canada | 16/29 |
| 2309697 | 11/1976 | France | 16/29 |
| 787918 | 12/1957 | United Kingdom | 16/29 |
| 1504522 | 3/1978 | United Kingdom | 248/188.8 |

*Primary Examiner*—J. Franklin Foss
*Assistant Examiner*—Robert A. Olson

[57] ABSTRACT

Wheel support (10) for furniture or furniture parts of the type having a downwardly extending pin (4) adapted for mounting, preferably releasably mounting of a wheel support (10) in which a furniture wheel (19) can be mounted, and whereby the means of the furniture or furniture part to which the wheel support (10) is connected is a tube like or bar like means (1), and in which the wheel support (10) comprises a supporting part (11) having an upwards opening recess (17) at or close to one end thereof for localizing of the wheel support in the horizontal direction on the tube or bar like means (1) by pressing the wheel support onto said downwardly extending pin (4), and at or close to the opposite end a downwards opening bore (18) for a vertical support pin of the furniture wheel (19), and in which said supporting part (11) has an upper surface (12) adapted, in mounted condition, to be in contact with the bottom surface of the tube or bar like means (1) so as to support the entire wheel support (10) and thereby also the furniture wheel (19) against said furniture or furniture part, and in which said supporting part (11) is formed with upwards extending arms (13, 14) having barbs (15, 16) adapted to engage the upper surface of the tube or bar means (1) and to maintain the wheel support secured thereto.

5 Claims, 2 Drawing Sheets

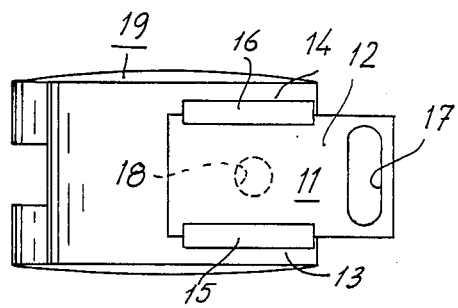
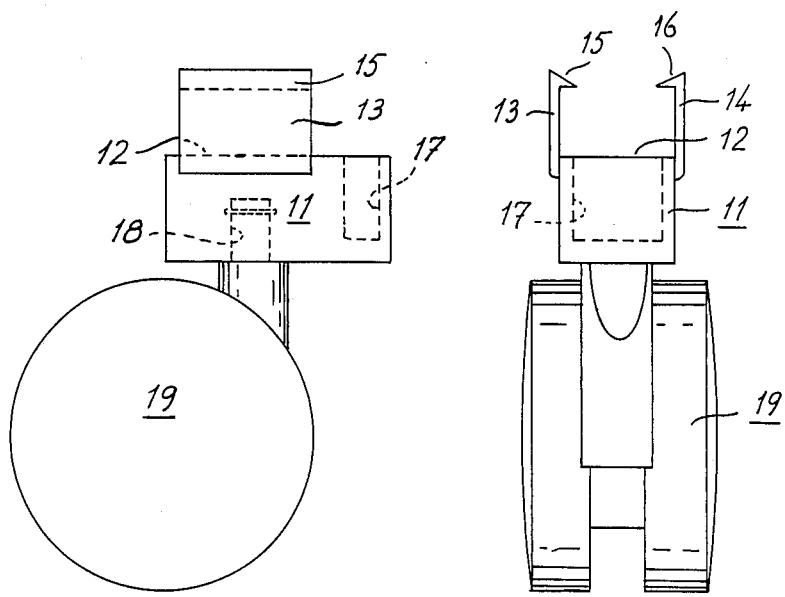
Fig. 3
Fig. 4    Fig. 5
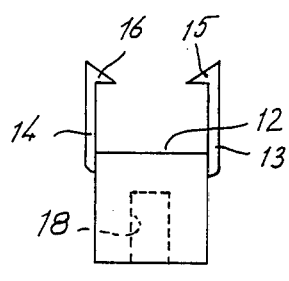
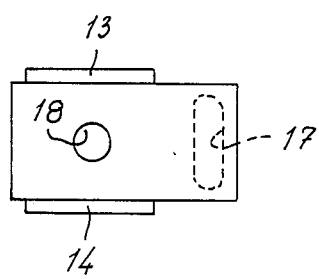
Fig. 6    Fig. 7

WHEEL SUPPORT FOR MOUNTABLE FURNITURE PARTS

The present invention relates to a wheel support for furniture or furniture parts, especially furniture parts that can be assembled by the user and of the type which, for mounting of wheel support, is formed with a downwards directed pin adapted for mounting of wheel support, especially a dismountable wheel support on which a furniture wheel, for instance a caster roller, can being mounted, and in which the furniture part may be a tube or a bar.

By furniture is meant, in this connection, any products which preferably are adapted for being moved on wheels, for instance tables, cupboards, pedestals of drawers, carriers for drawers and baskets etc., and by furniture part is meant a part of the furniture located at the bottom thereof, on which a wheel support with a wheel or roller can be mounted, for instance a tube or a bar or any other means which is formed with the above mentioned downwardly directed pin for mounting of the wheel support.

A known wheel support for such furniture parts comprises a sleeve adapted for being urged onto the support pin and formed with a free hanging support plate extending sideways therefrom and formed with a bore in which a mounting screw for the furniture wheel is adapted to be screw mounted. The sleeve with the support plate can be mounted so that the support plate is directed out from the furniture part, but in many cases there is a wish that the wheel is mounted so that it is not positioned too far outside of the furniture part in any position and with any part thereof, and in such cases the wheel support is mounted with the support plate turned inwards of the furniture part.

Irrespectively of how the wheel support is mounted on the support pin the wheel will, when loaded, subject the support plate to a bending moment which at a too strong load becomes so large that the support plate is bent or, in the worst case, can be broken. It also may happen that the mutual friction force between the wheel support and the the furniture support pin is so low that the wheel support with the wheel can get loose and drop down when the furniture part is lifted from the floor plane.

An example of a furniture part with a wheel support of the said known type is illustrated in FIG. 1.

The present invention is intended to solve the above mentioned problems and to provide a wheel support for furniture parts, especially furniture parts of the above mentioned type that can be assembled by the user and in which the support pin for the wheel support is used for mounting of the wheel support mainly in the horizontal plane only, whereas the very furniture part, for instance the tube or the bar, is utilized as a support plane for the wheel and preferably also as a locking means for the wheel support to the furniture part, so that there is no risk that the wheel support gets loose from the furniture part.

Further characteristics of the invention will be evident from the following detailed specification in which reference will be made to the accompanying drawings. It is, however, to be understood that the illustrated embodiment of the invention is only a clarifying example and that many alternatives may be presented within the scope of the appended claims.

In the drawings

FIG. 3 shows the wheel support according to FIG. 2 from above,

FIG. 4 is a side view thereof,

FIG. 5 is a view of the wheel support from the outside the furniture part,

FIG. 6 is a view from inside the furniture part, and

FIG. 7 is a bottom view of the wheel support.

Figure 1:
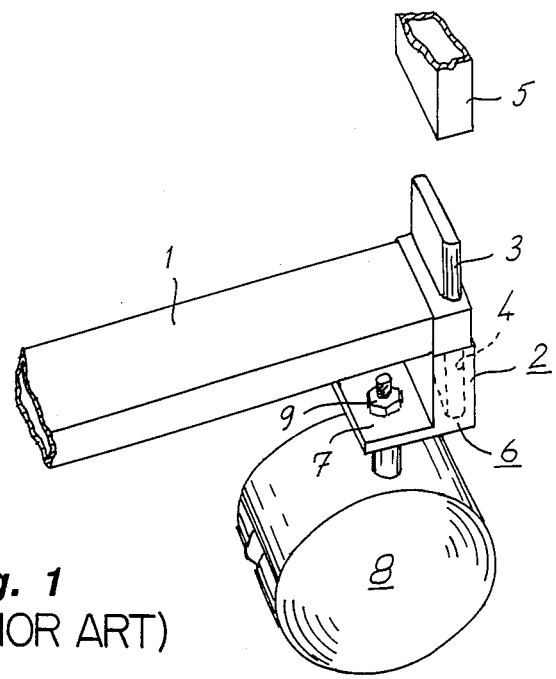
FIG. 1 shows diagrammatically and in a perspective view a wheel support for a mountable furniture part according to the prior art technics.
Figure 2:
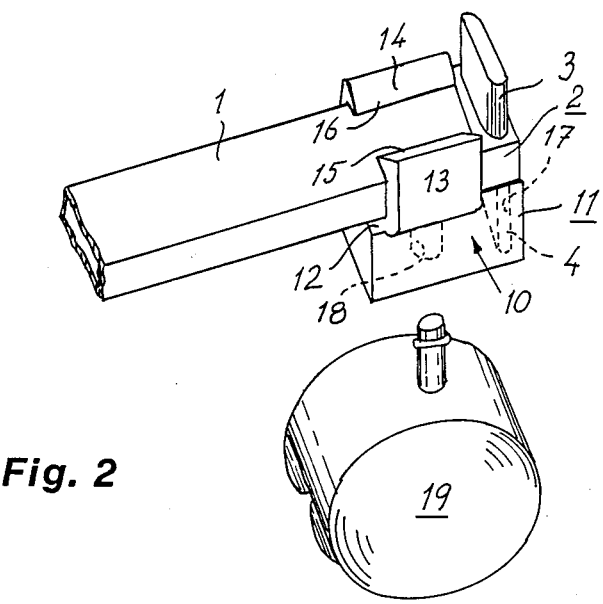
FIG. 2 shows similarly a wheel support according to the invention.

The apparatus of known type shown in FIG. 1 comprises a horizontal bottom bar 1 which at the outer end has a support 2 in the form of a "lying" T. The T-stem is fixed mounted in the bar 1 and the T-branches 3 and 4 are adapted for the connection of a vertical bar 5 and a wheel support 6 respectively. In the illustrated case the wheel support 6 is formed with a support plate 7 which extends free hanging towards the longitudinal centre of the bar 1, and in which a caster roller 8 of known type is mounted by means of a threaded pin and a nut 9.

As mentioned above there is a risk that the wheel support 6, if subjected to a too strong load, becomes bent or, in the worst case, becomes broken, and therefore a new type of wheel support has been invented which is shown in FIGS. 2-7.

The bottom bar 1 with the T-formed support means 2 and its branch pins 3 and 4 is identical to that of the known structure, but the wheel support 10 is quite new. The wheel support 10 preferably is made of synthetic resin or any other material which is at least slightly elastic and it comprises a supporting mounting part 11 having an upper surface 12 adapted to be in supporting contact with the bottom surface of the bar with a substantial part of said upper surface 12, and two outwardly extending arms 13 and 14 having barbs 15 and 16 provided on a mutual horizontal distance corresponding to the width of the bar 1 and on a vertical distance from the upper surface 12 of the mounting part 11 corresponding to the height of the bar 1, so that the barbs with a snug fit can engage the bar 1 and keep the wheel support secured on the bar. Since the material of the wheel support is at least slightly elastic the arms 13 and 14 with the barbs 15 and 16 can be forced over the bar 1 when mounting and dismounting of the wheel support.

At the outer end of the bar 1 the wheel support 10 is formed with an upwardly open enlongated bore 17 for the connection of the downwardly extending T-branch 4. In the illustrated case the bore 17 only has a horizontally guiding and securing effect. The holding and at the same time vertically the guiding effect is provided by the arms 13 and 14. At a suitable place of the underside of the support part there is a bore 18 for a support pin of a caster roller 19. When mounting the caster roller 19 in the wheel support said support pin is pressed into the bore 18 and is secured in this position by means of a spring ring or any other known securing means. The bore 18 for the caster roller can be provided on any wanted place, and upon need several bores can be provided for alternative mounting of the caster roller 19.

By the described apparatus the very horizontal bar 1 will be the support, in the direction upwards, for the wheel support and thereby also for the wheel or roller, and there is no risk that any part is damaged depending on a too strong load. The wheel support is maintained well secured to the bar 1, but still releasable therefrom, and there is no risk that the wheel support is unintentionally released from the bar.

I claim:

1. A wheel support for furniture having a frame with a horizontally extending bar (1) and a depending pin (4) adjacent one end of the bar, the improvement to said wheel support comprising; a body part (11) having an upwardly open recess (17) for receiving the pin (4) and also including an upwardly facing flat horizontal surface (12) adopted to abut the lower surface of the bar (1), said body part (14) further including integrally formed laterally spaced upwardly projecting clip defining elements (13 and 14), each of which clip defining elements have inturned lips (15 and 16 respectively) adjacent their upper ends for embracing the upper surface of said bar (1), said clip defining elements cooperating with the upwardly facing surface (12) to clamp the body part (11) to the horizontally extending bar (1) and to the downwardly projecting pin (4).

2. A combination of claim 1 wherein said body part has a generally rectangular parallelepiped shape with a lateral dimension matched closely to that of the horizontally extending bar (1).

3. A combination of claim 2 wherein said body part (11) has a downwardly open bore in its lower surface for receiving a furniture wheel pintle.

4. A combination of claim 3 wherein said horizontally extending bar also has a generally rectangular external configuration, and wherein the inturned upper end portions of the clip defining elements include downwardly facing abutment surfaces for engaging the upper horizontally extending surface of the horizontally extending bar.

5. A combination of claim 4 wherein said body part is fabricated from an elastic material so that the integrally formed upwardly extending clip defining elements and associated inturned upper end portions are snapped into place over the bar at assembly, the elastic material providing a continuing force to secure the body part to the bar.

* * * * *